(12) United States Patent
Roh (10) Patent No.: US 9,592,473 B2
(45) Date of Patent: Mar. 14, 2017

(54) SEPARATION AND RECYCLING SYSTEM OF PERFLUORINATED COMPOUNDS

(71) Applicant: FINETECH. CO., LTD, Gyeonggi-do (KR)

(72) Inventor: Young-Seok Roh, Suwon (KR)

(73) Assignee: FINETECH. CO., LTD., Gyeonggi-do (KR)

(*) Notice: Subject to any disclaimer, the term of this patent is extended or adjusted under 35 U.S.C. 154(b) by 0 days.

(21) Appl. No.: 14/394,027

(22) PCT Filed: Jul. 10, 2013

(86) PCT No.: PCT/KR2013/006146
§ 371 (c)(1),
(2) Date: Oct. 10, 2014

(87) PCT Pub. No.: WO2014/208808
PCT Pub. Date: Dec. 31, 2014

(65) Prior Publication Data
US 2016/0214062 A1    Jul. 28, 2016

(30) Foreign Application Priority Data

Jun. 25, 2013 (KR) ........................ 10-2013-0072924

(51) Int. Cl.
*B01D 53/22* (2006.01)
*B01D 63/06* (2006.01)

(52) U.S. Cl.
CPC ........... *B01D 63/06* (2013.01); *B01D 53/227* (2013.01); *B01D 2257/102* (2013.01);
(Continued)

(58) Field of Classification Search
CPC  B01D 63/06; B01D 2313/10; B01D 2313/50; B01D 2317/04; B01D 53/22;
(Continued)

(56) References Cited

U.S. PATENT DOCUMENTS 2,378,350 A * 6/1945 Worthen ................... C02F 1/04
 159/44
2,947,687 A * 8/1960 Lee ....................... B01D 61/364
 208/308

(Continued)

FOREIGN PATENT DOCUMENTS

KR  10-1997-0006542 A   2/1997
KR     10-0266460 B1    9/2000
(Continued)

*Primary Examiner* — Anthony Shumate
(74) *Attorney, Agent, or Firm* — John K. Park; Park Law Firm (57) ABSTRACT

The present invention relates to a system for separating and recycling a perfluorinated or perfluor compound, and more particularly, to a system for separating and recycling a perfluorinated compound, which is developed to prevent damage of separation membranes and degradation of the separation efficiency of through the application of a constant pressure to respective separation membranes when the perfluoro compound passes through a plurality of separation membranes in a process of effectively separating, removing and recycling the perfluoro compound including sulfur hexafluoride primarily generated in a semiconductor manufacturing process.

5 Claims, 9 Drawing Sheets

(52) U.S. Cl.
CPC .. *B01D 2257/2047* (2013.01); *B01D 2257/55* (2013.01); *B01D 2258/0216* (2013.01); *B01D 2311/25* (2013.01); *B01D 2313/10* (2013.01); *B01D 2313/50* (2013.01); *B01D 2317/04* (2013.01); *Y02C 20/30* (2013.01)

(58) Field of Classification Search
CPC .. B01D 53/48; B01D 53/54; B01D 2313/105; B01D 2257/30; B01D 2257/40; B01D 2311/25; B01D 2258/0216; B01D 2257/55; B01D 2257/2047; B01D 2257/102; B01D 53/227; Y02C 20/30
See application file for complete search history.

(56) References Cited

U.S. PATENT DOCUMENTS

| | | | | |
|---|---|---|---|---|
| 3,307,330 A | * | 3/1967 | Niedzielski | B01D 53/22 95/45 |
| 4,880,441 A | * | 11/1989 | Kesting | B01D 53/22 95/47 |
| 5,281,255 A | * | 1/1994 | Toy | B01D 71/44 55/524 |
| 5,730,779 A | * | 3/1998 | Chernyakov | B01D 53/22 95/149 |
| 5,759,237 A | * | 6/1998 | Li | B01D 53/228 95/128 |
| 5,779,763 A | * | 7/1998 | Pinnau | B01D 53/002 95/39 |
| 5,785,741 A | * | 7/1998 | Li | B01D 53/22 96/134 |
| 5,843,208 A | * | 12/1998 | Anumakonda | B01D 53/228 95/45 |
| 5,855,647 A | * | 1/1999 | Li | B01D 53/22 423/155 |
| 5,858,065 A | * | 1/1999 | Li | B01D 53/22 95/230 |
| 5,919,285 A | * | 7/1999 | Li | B01D 53/22 95/131 |
| 5,976,222 A | * | 11/1999 | Yang | B01D 53/226 95/131 |
| 6,032,484 A | * | 3/2000 | Chernyakov | B01D 53/02 62/624 |
| 6,224,677 B1 | * | 5/2001 | Nozawa | B01D 8/00 118/715 |
| 6,395,066 B1 | * | 5/2002 | Tanihara | B01D 53/22 95/47 |
| 6,444,011 B2 | * | 9/2002 | Li | 95/149 |
| 6,843,830 B2 | * | 1/2005 | Sherer | B01D 53/04 423/210 |
| 7,128,882 B2 | * | 10/2006 | Tamata | B01D 53/68 422/177 |
| 7,384,618 B2 | * | 6/2008 | Singh | C01B 21/0837 423/406 |
| 7,527,676 B2 | * | 5/2009 | Tajima | B01D 53/025 73/23.39 |
| 9,302,214 B2 | * | 4/2016 | Henderson | B01D 53/047 |
| 2002/0023540 A1 | * | 2/2002 | Abe | B01D 53/02 96/134 |
| 2002/0062734 A1 | * | 5/2002 | Pittroff | B01D 53/22 95/47 |
| 2003/0129118 A1 | * | 7/2003 | Miller | B01D 3/36 423/383 |
| 2004/0045432 A1 | * | 3/2004 | Yamamoto | B01D 53/22 95/48 |
| 2004/0123907 A1 | * | 7/2004 | Kim | C23C 16/45561 137/552 |
| 2005/0011353 A1 | * | 1/2005 | Shirley | B01D 53/0462 95/45 |
| 2007/0119480 A1 | * | 5/2007 | Nam | B08B 3/00 134/22.1 |
| 2011/0247297 A1 | * | 10/2011 | Bae | E04B 5/40 52/838 |
| 2015/0367278 A1 | * | 12/2015 | Lee | B01D 53/22 96/4 |
| 2016/0083254 A1 | * | 3/2016 | Lim | C01B 21/0837 95/47 |

FOREIGN PATENT DOCUMENTS

| | | |
|---|---|---|
| KR | 10-0588025 B1 | 6/2006 |
| KR | 10-2008-0065851 A | 7/2008 |
| KR | 10-0998883 B1 | 12/2010 |

* cited by examiner

Figure 9 ately, in a structure in which several conduits are branched off from a conduit and then join with each via the separation membrane, different pressures are applied to respective separation membranes, causing a problem in that the separation membranes are damaged and the efficiency is degraded.

SEPARATION AND RECYCLING SYSTEM OF PERFLUORINATED COMPOUNDS

TECHNICAL FIELD

The present invention relates to a system for separating and recycling a perfluorinated or perfluor compound, and more particularly, to a system for separating and recycling a perfluoro compound, which is developed to prevent damage of separation membranes and degradation of the separation efficiency of through the application of a constant pressure to respective separation membranes when the perfluoro compound passes through a plurality of separation membranes in a process of effectively separating, removing and recycling the perfluoro compound including sulfur hexafluoride primarily generated in a semiconductor manufacturing process.

BACKGROUND ART

Recently, as the change in climates and ecosystems due to global warming is remarkable over time, the interest in this is increasing gradually. The interest in regulation of the greenhouse gas emissions as the main cause of the global warming is also increasing all over the world.

However, most people think that only carbon dioxide ($CO_2$) contributes to the greenhouse gas emissions, but methane ($CH_4$), nitrous oxide ($N_2O$), hydrofluorocarbons ($HFC_S$) as perfluorinated or perfluoro compounds, perfluorocarbons ($PFC_S$), and sulfur hexafluoride ($SF_6$) are also the main cause of global warming.

The proportion of the aforementioned compounds reaches 12.2% or so in comparison with the amount of carbon dioxide increasing sharply in the atmosphere, which means that the compounds are discharged in a considerably large amount to the atmosphere. The perfluoro compounds are discharged in a considerably large amount in the electronics-related fields that can be regarded as one of the leading industries of Korea, including semiconductors, displays, LEDs, photovoltaic applications, and the like. The proportion of the perflouro compound emissions reaches 4.4%.

In particular, a large amount of dust, sulfur hexafluoride ($SF_6$) and silicon hexafluoride ($SiF_6$) are discharged to the outside in a process in which F-ions are produced using a plasma device and react with an insulator to perform etching to form a uniform pattern on a substrate.

In addition, a CVD chamber cleaning process is a process which removes a coating layer coated with an insulator ($SiO_2$) using a plasma etching method, In this process, $NF_3$ gas is mainly used, and dust, $NF_3$, $F_2$, $SiF_4$, and the like are discharged to the outside.

Various gases including the dust are mixed with a large amount of nitrogen and then are sucked into a dry pump to protect pumps and devices. Then, the gases are transferred to a post-treatment facility where only a gas scrubber is at present nearly installed.

Currently, various recycling systems are developed in which nitrogen is separated from other perfluoro compounds using a separation membrane allowing only nitrogen having the smallest particle to pass therethrough, and then the separated nitrogen is re-used and the perfluoro compounds are transferred to a re-treatment facility.

However, there is a high risk that the separation membrane will be damaged at high pressure. On the contrary, since there is a risk that the separation membrane will be decreased in the separation efficiency at low pressure, it is important to maintain a proper pressure. Nevertheless, in a

DISCLOSURE OF INVENTION

Technical Problem

Accordingly, the present invention has been made in order to solve the above-described problems occurring in the prior art, and it is an object of the present invention to provide a system for separating and recycling a perfluoro compound, in which the same pressure is applied to respective separation membranes in a plurality of branched membrane separation filters to separate nitrogen from a gas containing a perfluoro compound, nitrogen, and various kinds of impurities at preset pressure in a process in which the gas passes through the plurality of branched membrane separation filters to separate nitrogen from the gas.

Another object of the present invention is to provide a system for separating and recycling a perfluoro compound, in which the gas separation characteristics can be maximized to easily separate various kinds of gases including a perfluoro compound generated in the electronics industry.

Technical Solution

To accomplish the above object, in accordance with the present invention, there is provided a system for separating and recycling a perfluoro compound, which is configured to treat a dust-containing gas generated from an exhaust gas generating facility that uses or produces a perfluoro compound discharged in a dry etching process and a CVD chamber cleaning process, the system includes:

a buffer tank including an extension tube formed at one side thereof so as to allow an exhaust gas generated from at least one exhaust gas generating facility to be introduced thereto, wherein the extension tube has a cross section extended in a tapered shape, and the buffer tank 1 extends vertically downwardly from the extension tube;

a horizontal distribution pipe connected at one side to the other side of the buffer tank in such a manner as to extend in a horizontal direction;

a plurality of membrane separation filters, each connected at a lower end to the horizontal distribution pipe and including a separation membrane extending vertically upwardly so that a nitrogen gas having a small particle size passes therethrough and an impurity gas containing the perfluoro compound does not pass therethrough, the membrane separation filters being spaced apart from each other at predetermined intervals;

an impurity gas discharge conduit configured to collect the impurity gas that does not pass through the separation membranes in the plurality of membrane separation filters, and transfer the collected impurity gas to a retreatment chamber;

a first nitrogen gas recycling conduit having a first vacuum pump and an auxiliary membrane separation filter mounted thereon, so that the first vacuum pump collects the nitrogen gas that passes through the separation membranes in the plurality of membrane separation filters and sucks the collected nitrogen gas, and the auxiliary membrane separation filter re-separates the nitrogen gas sucked by the first vacuum pump so as to allow the impurity gas to be discharged to the impurity gas discharge conduit and the nitrogen gas to be transferred for recycling;

a second nitrogen gas recycling conduit having a second vacuum pump 61 mounted thereon so that the second vacuum pump sucks the nitrogen gas passing through a separation membrane in the auxiliary membrane separation filter and allows a high-purity nitrogen gas sucked thereby to be transferred for recycling; and a return conduit having first and second detection sensors and first and second three-phase valves mounted thereon so that the first and second detection sensors detect sulfur hexafluoride and nitrogen trifluoride of the conduit immediately after passing through the first and second vacuum pumps of the first and second nitrogen gas recycling conduits, and the return conduit collects sulfur hexafluoride and nitrogen trifluoride after selectively being connected to the conduits immediately after sulfur hexafluoride and nitrogen trifluoride pass through the first and second vacuum pumps by means of the first and second three-phase valves, respectively, so as to allow sulfur hexafluoride and nitrogen trifluoride to be re-introduced into the buffer tank.

In addition, the horizontal distribution pipe connected to the buffer tank may include a heating device mounted therein, the heating device having a built-in hot wire so that the hot wire rises to a preset temperature.

Besides, the horizontal distribution pipe may include a pair of disc-shaped diaphragm flanges mounted therein so as to be positioned in the proximity to one end of the horizontal distribution pipe, wherein the diaphragm flange has an outer diameter corresponding to an inner diameter of the horizontal distribution pipe so that the outer peripheral surfaces of the diaphragm flanges are brought into close contact with the inner peripheral surface of the horizontal distribution pipe, and has a circular hole formed at the center thereof, and a mesh pipe inserted at both sides into the circular hole of the diaphragm flange 22, the mesh pipe having an outer diameter corresponding to an inner diameter of the circular hole.

Further, the buffer tank may be connected to the horizontal distribution pipe by means of a connection pipe configured in such a manner as to be bent horizontally and then bent vertically upwardly again so as to be connected at one end to the other side of the buffer tank and connected at the other end to the underside of an intermediate portion of the horizontal distribution pipe.

In addition, the horizontal distribution pipe connected with the connection pipe may further include a pressure relief diaphragm formed therein in such a manner as to be vertically spaced apart from an inlet of the horizontal distribution pipe, which is connected to the connection pipe, and extend horizontally in the horizontal distribution pipe so that the gas introduced into the horizontal distribution pipe is moved in both directions.

Advantageous Effects

As described above, the present invention has advantageous effects in that the same pressure is applied to respective separation membranes in a plurality of branched membrane separation filters to separate nitrogen from a gas containing a perfluoro compound, nitrogen, and various kinds of impurities at preset pressure in a process in which the gas passes through the plurality of branched membrane separation filters to separate nitrogen from the gas, thereby leading to a reduction in damage of the separation membrane and an increase in the separation efficiency.

In addition, the gas inside the horizontal distribution pipe can be heated to a proper temperature, thereby increasing the diffusion speed of gas and thus improving the separation efficiency in the separation membrane.

BRIEF DESCRIPTION OF THE DRAWINGS

The above and other objects, features and advantages of the present invention will be apparent from the following detailed description of the preferred embodiments of the invention in conjunction with the accompanying drawings, in which.

*Explanation on reference numerals of main elements in the drawings*

| | |
|---|---|
| 1: buffer tank | 11: extension tube |
| 12: connection pipe | 2: horizontal distribution pipe |
| 21: heating device | 22: diaphragm flange |
| 23: mesh pipe | 24: pressure relief diaphragm |
| 3: membrane separation filter | |
| 4: impurity gas discharge conduit | |
| 5: first nitrogen gas recycling conduit | |
| 51: first vacuum pump | |
| 52: auxiliary membrane separation filter | |
| 6: second nitrogen gas recycling conduit | 7: return conduit |
| 61: second vacuum pump | |
| 71: first detection sensor | |
| 72: second detection sensor | |
| 73: first three-phase valve | |
| 74: second three-phase valve | |

BEST MODE FOR CARRYING OUT THE INVENTION

Now, preferred embodiments of the present invention will be described in detail with reference to the accompanying drawings. In the following description, the detailed description on relevant known functions and constructions unnecessarily obscuring the subject matter of the present invention will be avoided hereinafter.

Hereinafter, the configuration of the present invention will be described in detail with reference to the companying drawings so as to allow those skilled in the art to easily understand and carry out the present invention.

Figure 1:
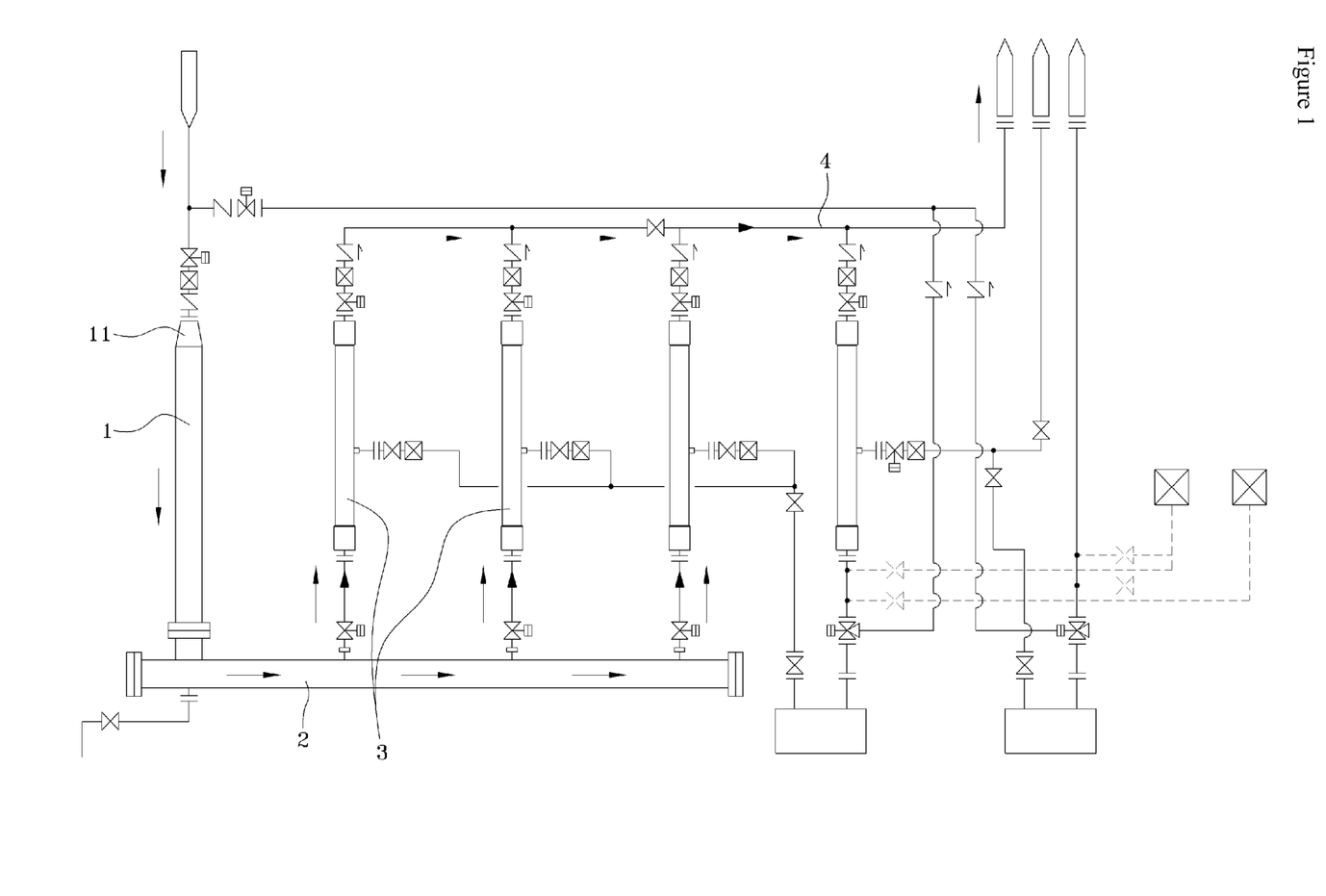
FIG. 1 is a conceptual view showing an impurity gas discharge process according to an embodiment of the present invention.
Figure 2:
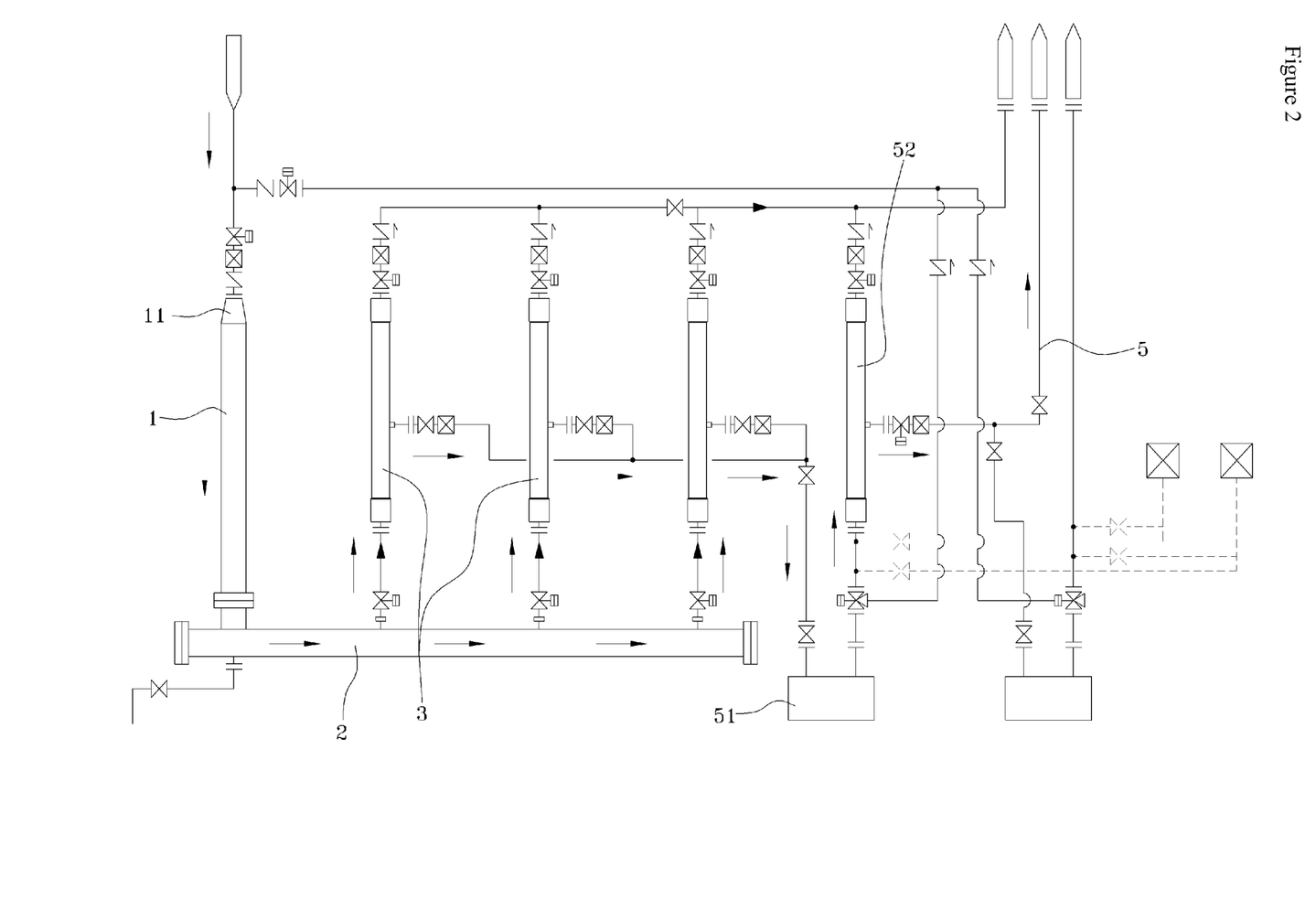
FIG. 2 is a conceptual view showing a nitrogen gas separation process according to an embodiment of the present invention.
Figure 3:
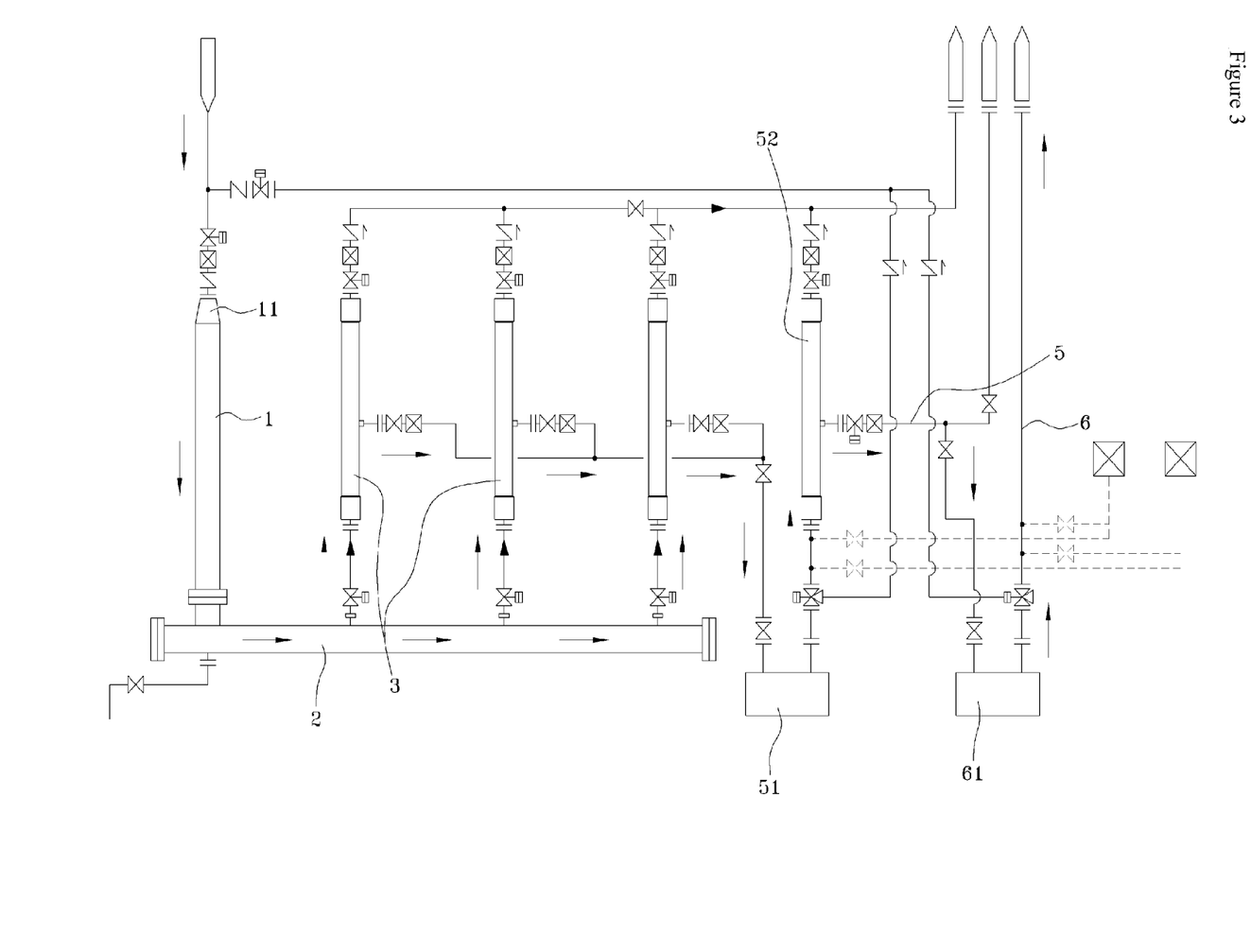
FIG. 3 is a conceptual view showing a high-purity nitrogen gas separation process according to an embodiment of the present invention.
Figure 4:
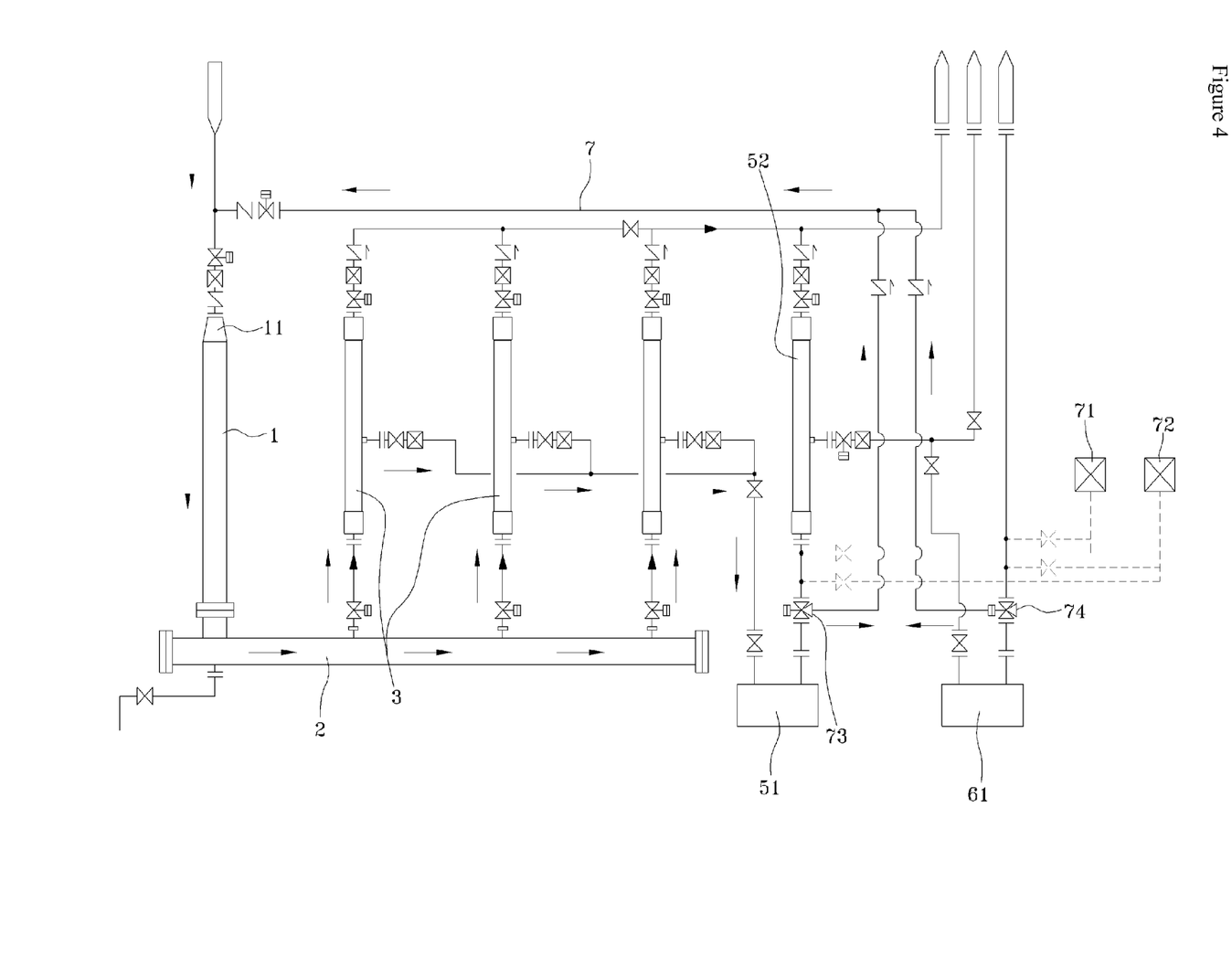
FIG. 4 is a conceptual view showing a return process in the damage of a separation membrane according to an embodiment of the present invention.
Figure 5:
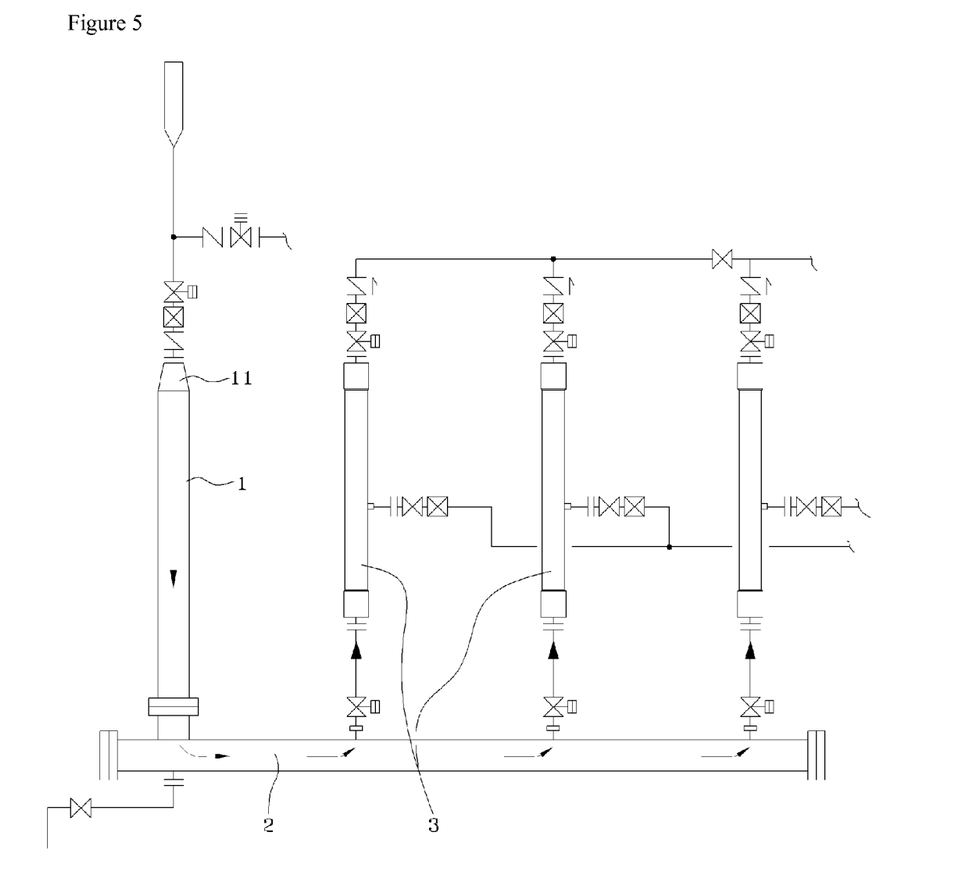
FIG. 5 is a conceptual view showing a buffer tank and a horizontal distribution pipe according to an embodiment of the present invention.

FIG. 1 is a conceptual view showing an impurity gas discharge process according to an embodiment of the present invention, FIG. 2 is a conceptual view showing a nitrogen gas separation process according to an embodiment of the present invention, FIG. 3 is a conceptual view showing a high-purity nitrogen gas separation process according to an embodiment of the present invention, FIG. 4 is a conceptual view showing a return process in the damage of a separation membrane according to an embodiment of the present invention, and FIG. 5 is a conceptual view showing a buffer tank and a horizontal distribution pipe according to an embodiment of the present invention.

A system for separating and recycling a perfluoro compound according to the present invention treats a dust-containing gas generated from an exhaust gas generating facility that uses or produces a perfluoro compound discharged in a dry etching process and a CVD chamber cleaning process.

The system according to the present invention includes:

a buffer tank 1 including an extension tube 11 formed at one side thereof so as to allow an exhaust gas generated from at least one exhaust gas generating facility to be introduced thereto, wherein the extension tube 11 has a cross section extended in a tapered shape, and the buffer tank 1 extends vertically downwardly from the extension tube 11;

a horizontal distribution pipe 2 connected at one side to the other side of the buffer tank 1 in such a manner as to extend in a horizontal direction;

a plurality of membrane separation filters 3, each connected at a lower end to the horizontal distribution pipe 2 and including a separation membrane extending vertically upwardly so that a nitrogen gas having a small particle size passes therethrough and an impurity gas containing the perfluoro compound does not pass therethrough, the membrane separation filters being spaced apart from each other at predetermined intervals;

an impurity gas discharge conduit 4 configured to collect the impurity gas that does not pass through the separation membranes in the plurality of membrane separation filters 3, and transfer the collected impurity gas to a retreatment chamber;

a first nitrogen gas recycling conduit 5 having a first vacuum pump 51 and an auxiliary membrane separation filter 52 mounted thereon, so that the first vacuum pump 51 collects the nitrogen gas that passes through the separation membranes in the plurality of membrane separation filters 3 and sucks the collected nitrogen gas, and the auxiliary membrane separation filter 52 re-separates the nitrogen gas sucked by the first vacuum pump 51 so as to allow the impurity gas to be discharged to the impurity gas discharge conduit 4 and the nitrogen gas to be transferred for recycling;

a second nitrogen gas recycling conduit 6 having a second vacuum pump 61 mounted thereon so that the second vacuum pump 61 sucks the nitrogen gas passing through a separation membrane in the auxiliary membrane separation filter 52 and allows a high-purity nitrogen gas sucked thereby to be transferred for recycling; and a return conduit 7 having first and second detection sensors 71 and 72 and first and second three-phase valves 73 and 74 mounted thereon so that the first and second detection sensors 71 and 72 detect sulfur hexafluoride and nitrogen trifluoride of the conduit immediately after passing through the first and second vacuum pumps 51 and 61 of the first and second nitrogen gas recycling conduits 5 and 6, and the return conduit 7 collects sulfur hexafluoride and nitrogen trifluoride after selectively being connected to the conduits 5 and 6 immediately after sulfur hexafluoride and nitrogen trifluoride pass through the first and second vacuum pumps 51 and 61 by means of the first and second three-phase valves 73 and 74, respectively, so as to allow sulfur hexafluoride and nitrogen trifluoride to be re-introduced into the buffer tank 1.

Conventionally, a method was adopted in which the system is connected by a simple conduit and is branched off to respective membrane separation filters 3. On the other hand, the present invention is aimed to solve the problems in that a high pressure is applied to the membrane separation filter 3 branched off and connected first and a low pressure is applied to the membrane separation filter 3 branched off and connected later so that the pressure as the most important factor in the separation process based on the separation membrane acts on the separation membrane relatively strongly or weakly, and in that if the pressure acts on the separation membrane strongly, the separation membrane will be damaged, and if the pressure acts on the separation membrane weakly, the separation membrane will be greatly decreased in the separation efficiency.

In an attempt to solve the problems, the present invention allows a space where a constant amount of gas can stay to be formed by the buffer tank 1 and the horizontal distribution pipe 2, but not a simple conduit so that although the gas escapes to the respective membrane separation filters 3, a preferably extended space for maintaining a constant pressure is provided.

This extended space allows a pressure at which the gas is supplied to the membrane separation filters 3 to be constantly provided as an optimum pressure so that the separation membrane is prevented from being damaged by the strong pressure and is prevented from being decreased in separation efficiency of the nitrogen gas by the weak pressure, thereby ensuring durability and the maximum separation efficiency.

In this case, an exhaust gas refers to a discharged gas. In particular, in the dry etching process, sulfur hexafluoride ($SF_6$), promethium (PM), silicon tetrafluoride ($SiF_4$), oxygen ($O_2$), $\delta SO_x$ and various kinds of dust are discharged as the exhaust gas. The impurity gas refers to a gas in which nitrogen gas is removed and the residual gases are mixed together.

At this time, if only nitrogen, sulfur hexafluoride, and nitrogen trifluoride remain using a pre-treatment filter before being supplied to the buffer tank 1, the separation and retreatment efficiency can be further increased.

In addition, the membrane separation filter 3 is a filter using the size of a particle. Nitrogen has a particle size of 3 anstrom (Å), and sulfur hexafluoride has a particle size of 5 anstrom (Å). Thus, the membrane separation filter 3 has a structure in which only nitrogen can pass through the membrane separation filter 3. Anstrom (Å) is a unit of length equal to 0.1 nanometer.

Further, the first and second vacuum pumps 51 and 61 suck nitrogen from the membrane separation filter 3 or the auxiliary membrane separation filter 52 to increase the separation efficiency.

In addition, the return conduit 7 returns the gas to the buffer tank due to damage of the separation membrane when sulfur hexafluoride or nitrogen trifluoride is detected by the first or second detection sensor 71 or 72.

Figure 6:
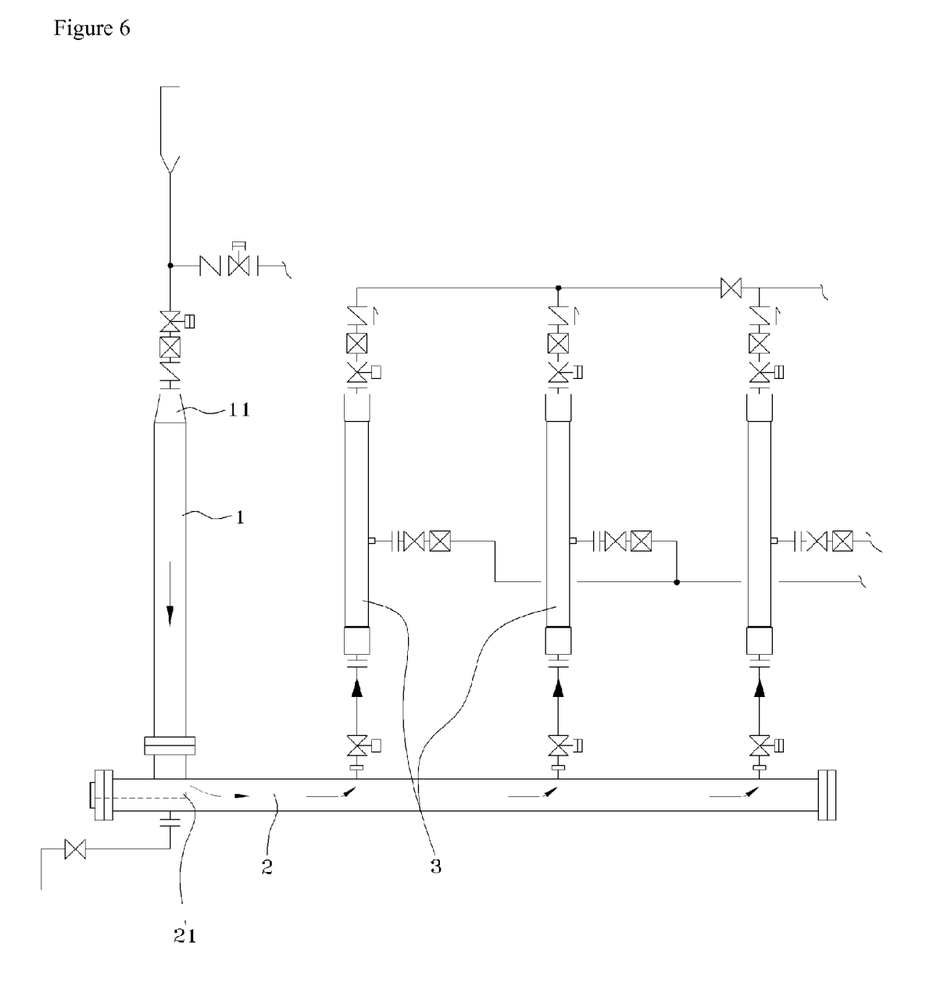
FIG. 6 is a conceptual view showing a buffer tank and a horizontal distribution pipe according to a first alternative embodiment of the present invention.

FIG. 6 is a conceptual view showing a buffer tank and a horizontal distribution pipe according to a first alternative embodiment of the present invention.

In FIG. 6, the horizontal distribution pipe 2 connected to the buffer tank 1 includes a heating device mounted therein, the heating device having a built-in hot wire so that the hot wire rises to a preset temperature.

Thus, in the above first alternative embodiment of the present invention, although the temperature of the gas in the horizontal distribution pipe 2 rises a little more, gas molecules moves rapidly and thus the diffusion speed of gas is increased, thereby improving the separation efficiency in the separation membrane.

Since the separation membrane is likely to be damaged at extremely high temperature, a temperature of 60-70° C. is proper.

Figure 7:
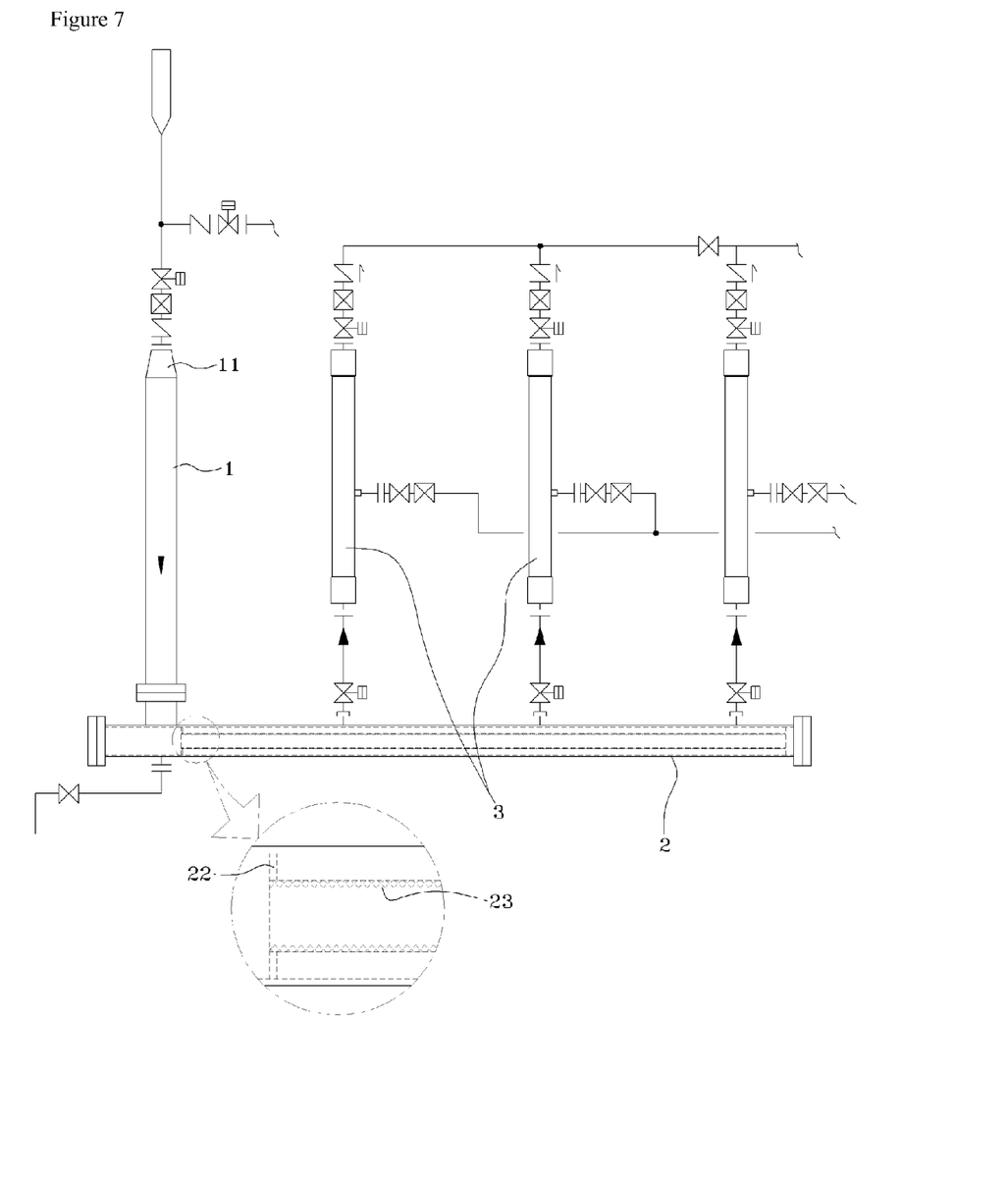
FIG. 7 is a conceptual view showing a buffer tank and a horizontal distribution pipe according to a second alternative embodiment of the present invention.

FIG. 7 is a conceptual view showing a buffer tank and a horizontal distribution pipe according to a second alternative embodiment of the present invention.

In FIG. 7, the horizontal distribution pipe 2 includes a pair of disc-shaped diaphragm flanges 22 mounted therein so as to be positioned in the proximity to one end of the horizontal distribution pipe 2, wherein the diaphragm flange has an outer diameter corresponding to an inner diameter of the horizontal distribution pipe 2 so that the outer peripheral surfaces of the diaphragm flanges are brought into close contact with the inner peripheral surface of the horizontal distribution pipe 2, and has a circular hole formed at the center thereof, and a mesh pipe 23 inserted at both sides into the circular hole of the diaphragm flange 22, the mesh pipe having an outer diameter corresponding to an inner diameter of the circular hole.

Thus, in the above second alternative embodiment of the present invention, when the gas flowing into the horizontal distribution pipe 2 is abruptly introduced into the membrane separation filters 3, a void of pressure is prevented from being yielded and a decrease in the pressure is alleviated by the mesh pipe 23

Figure 8:
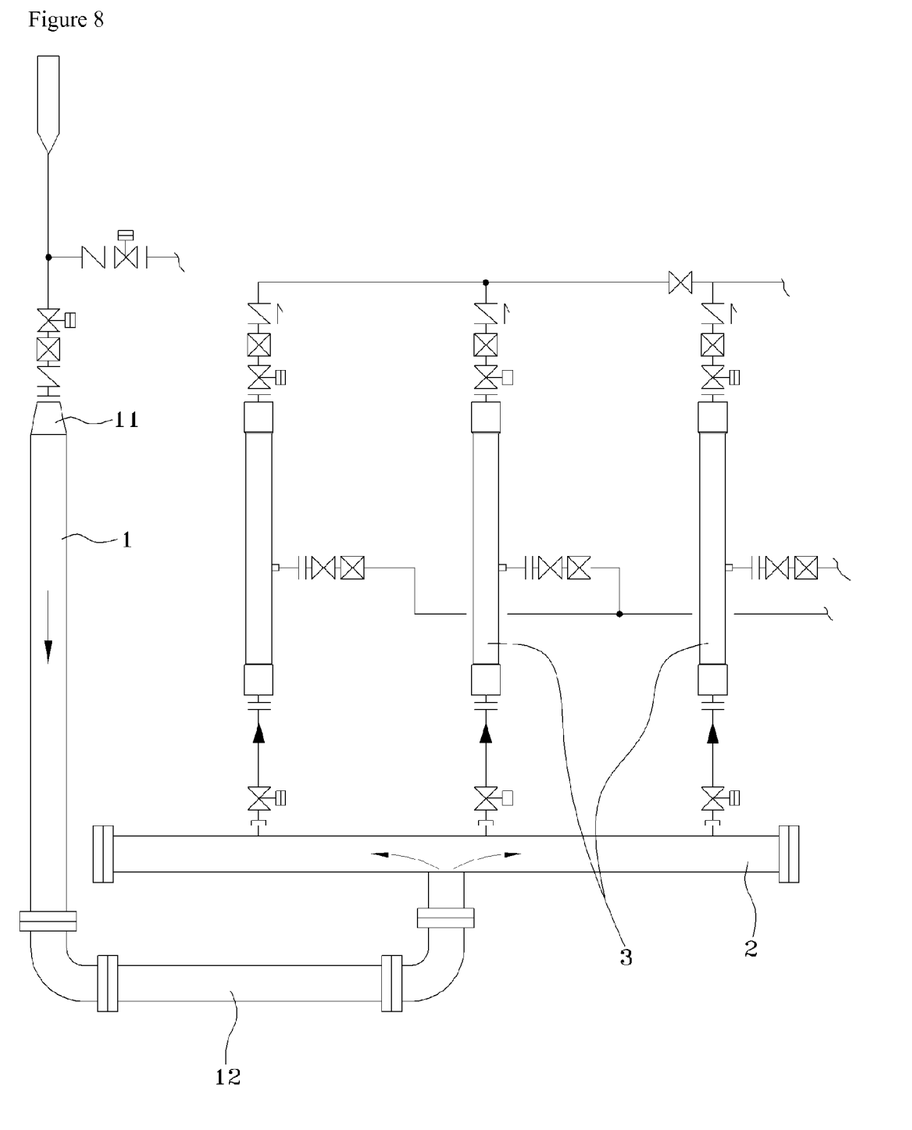
FIG. 8 is a conceptual view showing a buffer tank and a horizontal distribution pipe according to a third alternative embodiment of the present invention.

FIG. 8 is a conceptual view showing a buffer tank and a horizontal distribution pipe according to a third alternative embodiment of the present invention.

In FIG. 8, the buffer tank 1 is connected to the horizontal distribution pipe 2 by means of a connection pipe 12 configured in such a manner as to be bent horizontally and then bent vertically upwardly again so as to be connected at one end to the other side of the buffer tank 1 and connected at the other end to the underside of an intermediate portion of the horizontal distribution pipe 2.

As in the previously described embodiments, in the case where the buffer tank 1 is connected to one end of the horizontal distribution pipe 2, it is disadvantageous that a pressure is not evenly dispersed. Thus, in the above third alternative embodiment of the present invention, the buffer tank 1 is connected to the intermediate portion of the horizontal distribution pipe 2 so that a maximum pressure can be distributed evenly in the horizontal distribution pipe 2.

Figure 9:
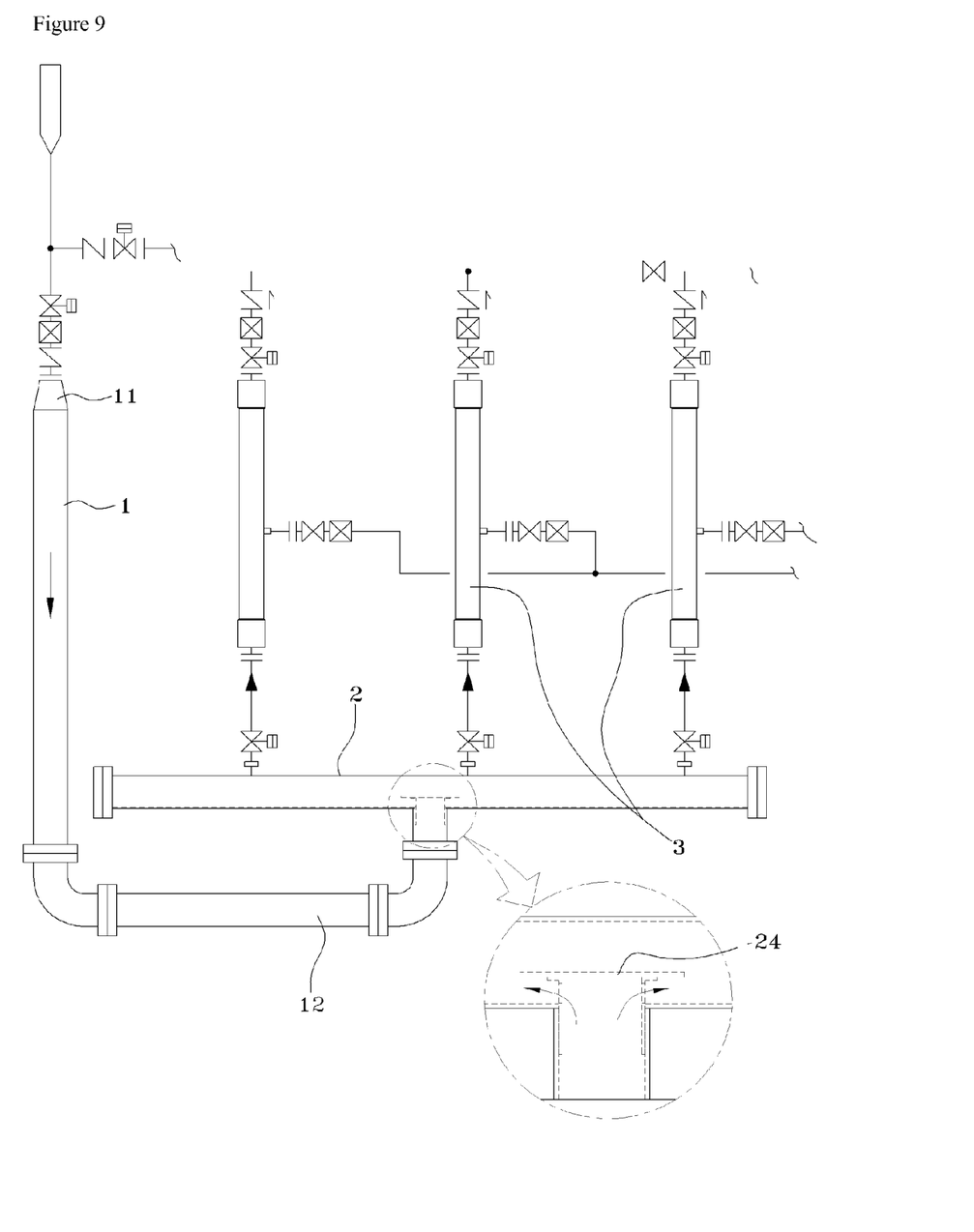
FIG. 9 is a conceptual view showing a buffer tank and a horizontal distribution pipe according to a fourth alternative embodiment of the present invention.

FIG. 9 is a conceptual view showing a buffer tank and a horizontal distribution pipe according to a fourth alternative embodiment of the present invention.

The horizontal distribution pipe 2 connected with the connection pipe 12 further includes a pressure relief diaphragm 24 formed therein in such a manner as to be vertically spaced apart from an inlet of the horizontal distribution pipe 2, which is connected to the connection pipe 12, and extend horizontally in the horizontal distribution pipe 2 so that the gas introduced into the horizontal distribution pipe 2 is moved in both directions. Thus, preferably, a strong pressure is prevented from acting on the membrane separation filter 3 positioned near a position of the horizontal distribution pipe 2, which is connected to the connection pipe 12

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, various embodiments of the present invention are merely for reference in defining the scope of the invention, and the true technical scope of the present invention should be defined by the technical spirit of the appended claims.

The invention claimed is:

1. A system for separating and recycling a perfluoro compound, which is configured to treat a dust-containing gas generated from an exhaust gas generating facility that produces or uses the perfluoro compound discharged in a dry etching process or a CVD chamber cleaning process respectively, the system comprises:

a buffer tank 1 including an extension tube 11 formed at one side of the buffer tank 1 so as to allow the exhaust gas generated from the exhaust gas generating facility to be introduced to the buffer tank 1, wherein the extension tube 11 has a cross section extended in a tapered shape, and the buffer tank 1 extends vertically downwardly from the extension tube 11;

a horizontal distribution pipe 2 connected at one side to other side of the buffer tank 1 in such a manner as to extend in a horizontal direction;

a plurality of membrane separation filters 3, each of which connected to the horizontal distribution pipe 2 at a lower end and including a separation membrane extending vertically upwardly so that a nitrogen gas having a small particle size passes through the separation membrane and an impurity gas containing the perfluoro compound does not pass separation membrane, the membrane separation filters being spaced apart from each other at predetermined intervals;

an impurity gas discharge conduit 4 configured to collect the impurity gas that does not pass through the separation membranes in the plurality of membrane separation filters 3, and transfer the collected impurity gas to a retreatment chamber;

a first nitrogen gas recycling conduit 5 with an auxiliary membrane separation filter 52 and a first vacuum pump 51 mounted through the auxiliary membrane separation filter 52, so that the first vacuum pump 51 collects the nitrogen gas that passes through the separation membranes in the plurality of membrane separation filters 3 and sucks the collected nitrogen gas, and the auxiliary membrane separation filter 52 re-separates the nitrogen gas sucked by the first vacuum pump 51 so as to allow the impurity gas to be discharged to the impurity gas discharge conduit 4 and the nitrogen gas to be transferred for recycling;

a second nitrogen gas recycling conduit 6 with a second vacuum pump 61 mounted to the second nitrogen as recycling conduit 6 so that the second vacuum pump 61 sucks the nitrogen gas passing through a separation membrane in the auxiliary membrane separation filter 52 and allows a high-purity nitrogen gas from the second vacuum pump 61 to be transferred for recycling; and a return conduit 7 with first and second three-phase valves 73 and 74 and first and second detection sensors 71 and 72 mounted through the first and second three-phase valves 73 and 74 so that the first and second detection sensors 71 and 72 detect sulfur hexafluoride and nitrogen trifluoride of the conduit portion immediately after passing through the first and second vacuum pumps 51 and 61 of the first and second nitrogen gas recycling conduits 5 and 6, and the return conduit 7 collects the sulfur hexafluoride and the nitrogen trifluoride after selectively being connected to the first nitrogen as recycling conduits 5 and 6 by means of the first and second three-phase valves 73 and 74 immediately after the sulfur hexafluoride and the nitrogen trifluoride pass through the first and second vacuum pumps 51 and 61, respectively, so as to allow the sulfur hexafluoride and the nitrogen trifluoride to be re-introduced into the buffer tank 1.

2. The system according to claim 1, wherein the horizontal distribution pipe 2 connected to the buffer tank 1 comprises a heating device mounted therein, the heating device having a built-in hot wire so that the hot wire rises to a preset temperature.

3. The system according to claim 1, wherein the horizontal distribution pipe 2 comprises a disc-shaped diaphragm flange 22 mounted in the horizontal distribution pipe 2 so as to be positioned in the proximity to one end of the horizontal distribution pipe 2, wherein the diaphragm flange has an outer diameter corresponding to an inner diameter of the horizontal distribution pipe 2 so that an outer peripheral surfaces of the diaphragm flange are brought into close contact with an inner peripheral surface of the horizontal distribution pipe 2, and the diaphragm flange has a circular hole formed at the center of the diaphragm flange and a mesh pipe 23 inserted at both sides into the circular hole of the diaphragm flange 22, the mesh pipe having an outer diameter corresponding to an inner diameter of the circular hole.

4. The system according to claim 1, wherein the buffer tank 1 is connected to the horizontal distribution pipe 2 by means of a connection pipe 12 configured in such a manner as to be bent horizontally and then bent vertically upwardly again so as to be connected at one end to the other side of the buffer tank 1 and connected at other end to an underside of an intermediate portion of the horizontal distribution pipe 2.

5. The system according to claim 4, wherein the horizontal distribution pipe 2 connected with the connection pipe 12 further comprises a pressure relief diaphragm 24 formed therein in such a manner as to be vertically spaced apart from an inlet of the horizontal distribution pipe 2, wherein the pressure relief diaphragm 24 is connected to the connection pipe 12 and extends horizontally in the horizontal distribution pipe 2 so that gas introduced into the horizontal distribution pipe 2 is moved in both directions of the horizontal distribution pipe 2.

* * * * *